April 11, 1950
J. BREEMES
2,503,793
CASTING FLOAT
Filed April 27, 1949
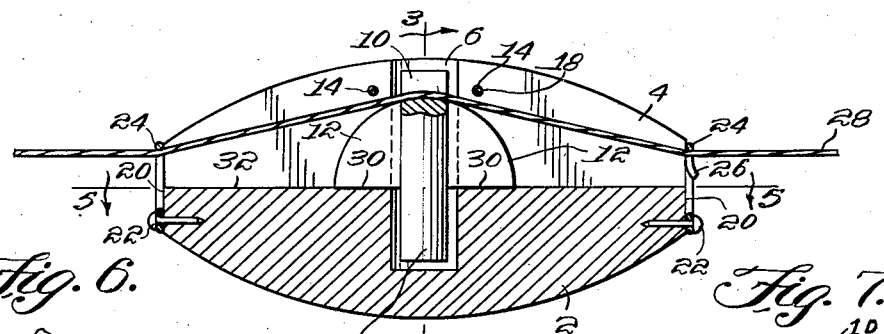
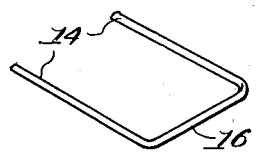
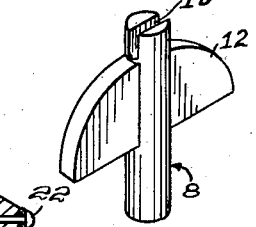
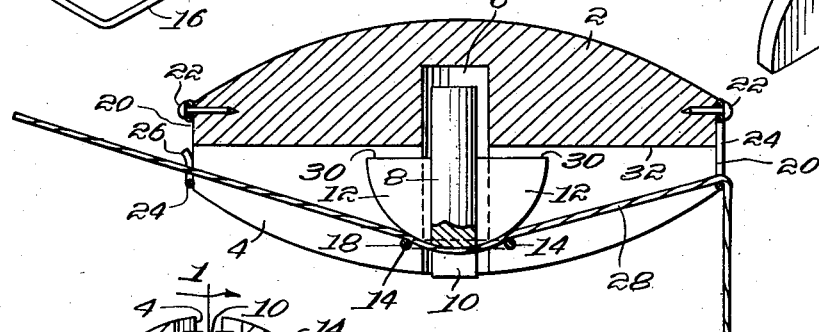
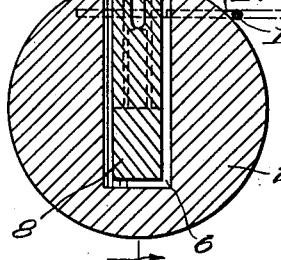
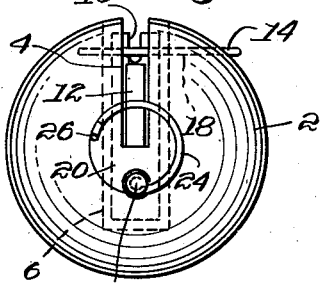
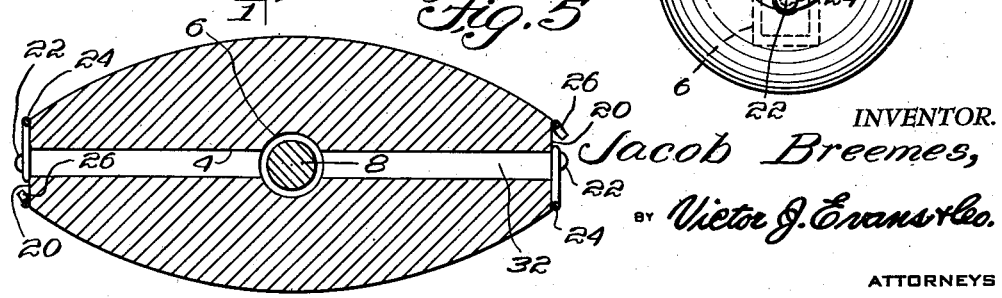
INVENTOR.
Jacob Breemes,
BY Victor J. Evans & Co.
ATTORNEYS Patented Apr. 11, 1950

2,503,793

UNITED STATES PATENT OFFICE 2,503,793

CASTING FLOAT

Jacob Breemes, Palmyra, N. Y.

Application April 27, 1949, Serial No. 89,980

4 Claims. (Cl. 43—44.87)

My present invention relates to an improved casting float of the type adopted for use on fishing lines so that when attached to the line near the hook, the line may be cast, and the line will run through the float as the sinker descends until the sinker touches bottom whereupon the float will operate automatically to engage the line and retain the float and sinker in relative position.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a longitudinal vertical sectional view of the casting float of my invention in running position.

Fig. 2 is a similar view of the float in inverted snubbing position.

Fig. 3 is a sectional view at line 3—3 of Fig. 1.

Fig. 4 is an end elevational view.

Fig. 5 is a sectional view at line 5—5 of Fig. 1.

Fig. 6 is a perspective view of the wire arms.

Fig. 7 is a perspective view of the central wedge.

Referring now to the drawings wherein I have illustrated the present preferred embodiment of my invention, I employ a float 2 of wood or other suitable material and of elongated ovate shape.

The float is formed with a longitudinal slot 4 therein to the center thereof and centrally of the length of the float and slot I provide a bore 6 overlying and extending diametrically beyond the walls of the slot 4 and extending beyond the center of the float.

A weight 8 of suitable metal has an upper transverse slot or kerf 10 and in diametrically opposed relation and parallel with the kerf I attach to the weight a pair of quadrant shaped wings 12 slidable in the slot 4, the weight being slidable in the bore 6.

A removable stop element for the weight is provided in the parallel bars 14 connected by arm 16, and these bars are snugly fitted into bores 18 in the float so that when inserted into the float the arms extend across the slot 2 to engage the wings 12.

On the flattened ends 20 of the float I secure as by pins 22, the retainer rings 24 the ends of which are curved outwardly at 26 and the fishing line 28 is passed through the rings and the slot 2, and the kerf 10, the stop element of course being removed during the threading of the line. The line is fully movable through the float when the weight is in the position of Fig. 1 with the edges 30 of the wings resting on the bottom 32 of slot 2.

In this position the line, with the float about one foot from the hook or sinker, is cast and as the sinker falls the line runs through the vertically positioned float.

As the sinker strikes the bottom or for any reason stops its descent the float will assume a horizontal position and the weight will invert the float whereupon the weight will move outwardly of the bore 6 to abut the bars 14 and to press the line therebetween.

Thus the line will be snugly held maintaining the float and sinker in relative position until a fish strikes and the line is reeled in whereupon the float will slide down the line to the sinker or hook facilitating the handling of the line and fish.

Having thus fully described my invention, what I claim as new and desire to secure by Letters Patent is:

1. A casting float of elongated ovate shape and having a longitudinally extending slot therein and a radial bore overlying the said slot, an end slotted weight movable in the bore, the fishing line passing through the slot and engaging the slot at the end of the weight and removable stop means across the slot in the path of the moving weight whereby the weight will snub the line between the stop means and the weight.

2. A casting float of elongated ovate shape and having a longitudinally extending slot therein and a radial bore overlying the said slot, a weight movable in the bore, lateral wings on the weight, the fishing line passing through the slot and engaging the outer end of the weight, and stop means across the slot in the path of the moving weight wings whereby the weight will snub the line between the stop means and the weight.

3. A casting float of elongated ovate shape and having a longitudinally extending slot therein and a radial bore overlying the said slot, a weight movable in the bore, the fishing line passing through the slot and engaging the outer end of the weight and stop means including removable parallel bars across the slot in the path of the moving weight whereby the weight will snub the line between the stop means and the weight.

4. A casting float of elongated ovate shape and having a longitudinally extending slot therein and a radial bore overlying the said slot, a weight movable in the bore, lateral wings on the weight, the fishing line passing through the slot and engaging the outer end of the weight and stop means including removable parallel bars across the slot in the path of the moving weight wings whereby the weight will snub the line between the stop means and the weight.

JACOB BREEMES.

REFERENCES CITED

The following references are of record in the file of this patent:

UNITED STATES PATENTS

| Number | Name | Date |
|---|---|---|
| 717,237 | Marsters | Dec. 30, 1902 |
| 1,122,359 | Bissett | Dec. 29, 1914 |
| 2,106,618 | Mehaffey | Jan. 25, 1938 |

FOREIGN PATENTS

| Number | Country | Date |
|---|---|---|
| 349,173 | France | 1905 |